United States Patent [19]

Kamijo et al.

[11] 4,039,703
[45] Aug. 2, 1977

[54] METHOD FOR PRODUCING A TUBULAR MULTI-LAYERED POROUS BARRIER

[75] Inventors: Eiji Kamijo; Tatsuya Nishimoto; Masaaki Honda, all of Itami, Japan

[73] Assignee: Sumitomo Electric Industries, Ltd., Itami, Japan

[21] Appl. No.: 519,215

[22] Filed: Oct. 30, 1974

[30] Foreign Application Priority Data

Nov. 13, 1973 Japan .............................. 48-126749
Nov. 13, 1973 Japan .............................. 48-126752
Nov. 13, 1973 Japan .............................. 48-126753
May 14, 1974 Japan .............................. 49-54123

[51] Int. Cl.² .......................... B05D 7/22; B22F 3/06; B01D 13/04
[52] U.S. Cl. .................................. 427/183; 427/189; 427/190; 427/195; 427/231; 427/234; 427/238; 427/240; 427/241; 427/346; 427/243; 427/247; 264/111; 264/112; 264/114; 264/69; 55/158; 29/420.5
[58] Field of Search .............. 427/181, 182, 183, 190, 427/189, 191, 195, 240, 241, 238, 205, 231, 234, 369, 370, 247, 243; 29/182.2, 420.5, 182.3, 192 R; 75/208 R, 222; 264/267, 269, 123, 112, 114, 111, 94, 270, 311, 45.2, 46.6, 113; 55/158, 523; 428/36

[56] References Cited

U.S. PATENT DOCUMENTS

| | | | |
|---|---|---|---|
| 1,676,815 | 7/1928 | Beatty | 427/11 |
| 2,267,918 | 12/1941 | Hildabolt | 55/523 X |
| 2,341,739 | 2/1944 | Olt | 75/222 |
| 2,390,160 | 12/1945 | Marvin | 75/208 R |
| 2,696,434 | 12/1957 | Bartlett | 75/208 R |
| 2,892,218 | 6/1959 | McGhee | 264/114 |
| 2,936,505 | 5/1960 | Witucki et al. | 264/311 X |
| 2,999,780 | 9/1961 | Perrault | 264/314 |
| 3,015,855 | 1/1962 | Merkel | 75/222 X |
| 3,287,801 | 11/1966 | Blenkarn | 264/270 X |
| 3,359,622 | 12/1967 | Meyer et al. | 75/208 R X |
| 3,579,400 | 5/1971 | Kanyok et al. | 264/267 X |
| 3,788,916 | 1/1974 | Gadelius | 264/270 X |

*Primary Examiner*—Ralph S. Kendall
*Attorney, Agent, or Firm*—Wenderoth, Lind & Ponack

[57] ABSTRACT

A method for producing a tubular multi-layered porous barrier comprising the step of depositing fine powder onto at least one of the inner and outer surfaces of a sintered tubular porous support member in a layer of uniform thickness to form a fine powder layer and pressurizing said powder layer against said support member to form a porous barrier layer on the support member.

12 Claims, 10 Drawing Figures

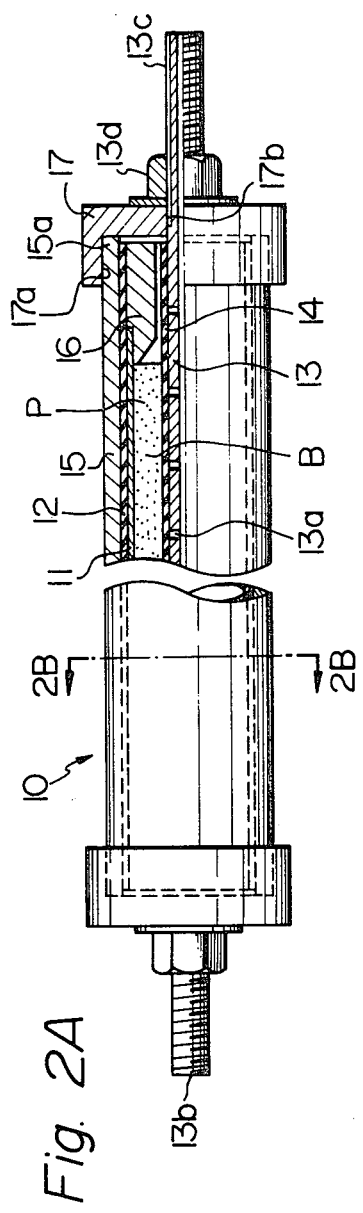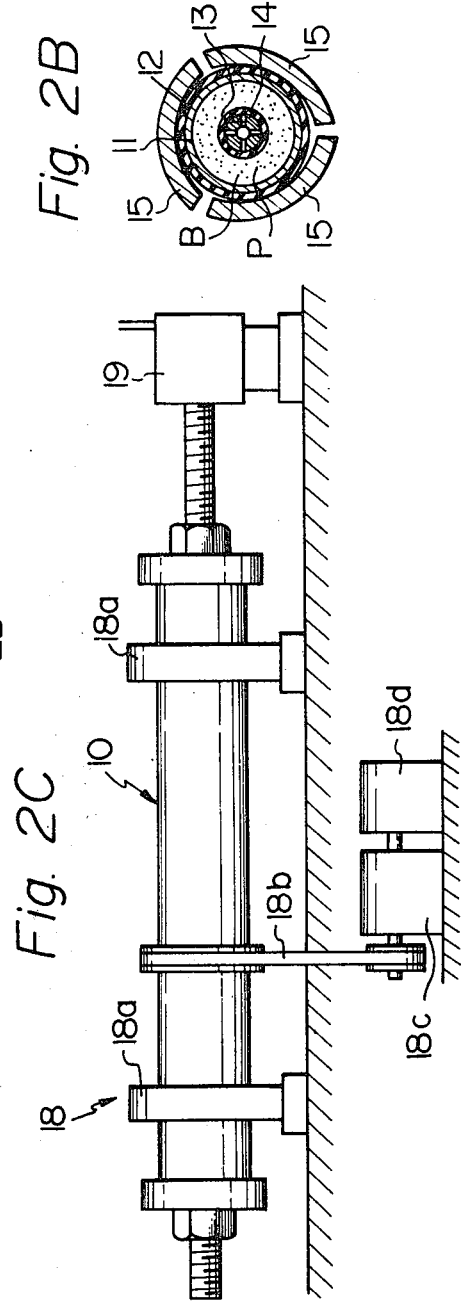

METHOD FOR PRODUCING A TUBULAR MULTI-LAYERED POROUS BARRIER

BACKGROUND OF THE INVENTION

This invention relates to a method for producing a tubular multi-layered porous barrier and more particularly, to a method fo producing a tubular multi-layered porous barrier in which fine powder is deposited onto the inner and/or outer surfaces of a sintered tubular porous support member in a layer of uniform thickness to form a fine powder layer, and wherein the powder layer is compressed against said inner and/or outer surfaces of the support member to form a porous barrier layer on the support member.

When an isotope such as uranium is separated and enriched, the separation and enrichment have been effected by the so-called gas diffusion system utilizing a porous barrier. Such a porous barrier generally comprises a porous base formed by sintering metal or cermaic powder or by compression-molding organic synthetic resin powder such as fluoric resin and has a plurality of find pores and especially, micro-fine pores of the average several 10 A – several hundred A. In order to effect the separation and enrichment of uranium efficiently, it is necessary to form as thin a porous barrier as possible. However, it is impossible to form a porous barrier which is excessively thin from the view point of strength. Thus, it is necessary to reinforce the thin porous barrier with a porous support member having a given thickness and a high gas permeability or with a wire net to thereby provide a multi-layered porous barrier structure.

On the other hand, when a multi-layered porous barrier is to be constructed in the form of a tube, such a tubular multi-layered porous barrier can be produced in any one of the prior art methods. Generally, the multi-layered tubular porous barrier is produced by bending a multi-layered porous barrier in the form of a sheet into a tube and then butt-welding the opposite side edges of the tube or lap-seaming the opposite side edges. However, when the porous barrier is formed of a ductile material such as metal or the like, the metal barrier can be shaped into a tubular construction, but when the porous barrier is formed of ceramic which has brittle, it is very difficult to shape such the barrier into a tube, because there is the possibility that a crack or cracks will develop in the barrier.

Even if the reinforcing support member is formed of a porous metal, the ductility of the reinforcing support member is substantially lower than that of a non-porous reinforcing support because of the presence of pores. Therefore, the porous reinforcing support member is subjected to limitations in the radius of curvature allowable for shaping the support member into a tubular structure, and it is very difficult to shape the porous reinforcing support member into a tube having the diameter range of 10–20 mm. For example, when Ni powder having an average pore diameter of 2–3$\mu$ is molded into a sheet having the porosity of 35% and thickness of 1.0 mm and the sheet is then formed into a tube, such a sheet can not be formed into a tube having a diameter less than 40 mm in diameter by the conventional forming methods.

Even if a multi-layered porous barrier which comprises a sheet-like porous barrier reinforced by a metal porous support tube of large diameter can be formed into a tube of smaller diameter, it is almost impossible to process such a multi-layered barrier having micro-fine pores on the order of several 10 A without inflicting damage to the barrier sheet.

Generally, when a porous tube is employed for any practical application, it is seldom that a single porous tube is employed and a plurality of porous tubes are usually employed in a group as seen in a multi-tube heat exchanger. In such a case, in order to increase the overall surface area of the porous tubes accommodated in a given space, it is necessary to employ porous tubes of small diameter. For example, in the enrichment of uranium, a plurality of units each comprising over ten thousand tubular barriers of 10–20 mm in diameter are employed in a diffusion cell (or unit).

With the above in mind, in the production of a tubular multi-layered porous barrier especially suitable for separation and enrichment of isotopes such as uranium by the gas diffusion system, it is contemplated that a porous support tube of small diameter be prepared by the conventional powder metallurgy method and a powder or powder adhering layer be compressed against the inner and/or outer surfaces of the tube in the thickness of several 10 – several hundred $\mu$.

In order to form or deposit a porous fine powder layer having a uniform thickness on the order to several hundred – several thousand $\mu$, such a layer can be formed by either the so-called dry method in which the powder is employed or the wet-method in which slurry is employed. By the wet method, the powder is employed in a slurry form provided by adding distilled water or an organic solvent such as alcohol or acetone and a bonding agent to the powder to render the powder into a paste state. Thus, the slurry has a high fluidity and can be easily formed into a deposition layer of uniform thickness. However, the wet method requires an evaporation step to dry the layer and the wet method has the disadvantage that a crack or cracks will develop in the deposited layer while the layer is being dried. Such crack development is generally known as "the mud crack". In the wet system, the prevention or control of the mud crack presents a very difficult problem.

On the other hand, the dry method has the disadvantage that the powder has a low fluidity and cannot be formed into a layer of uniform thickness. When the fine powder is loosely charged into a tubular porous support member or support tube and the support tube is rotated at a high speed while maintaining the porous tube horizontal, a layer of the powder may be formed having a uniform thickness both in the longitudinal and circumferential directions by a centrifugal force, but the adhesive power of the layer obtained by only a centrifugal force is insufficient and when the rotation of the porous tube is stopped, the uniformity in thickness of the layer would be easily lost.

According to the inventors, it has been found that a layer of fine powder can be firmly deposited on the inner surface of a porous support tube by inserting a flexible rubber tube into the hollow interior of the support tube in a peripherally spaced relationship, charging the fine powder into the annular space between the two tubes, rotating the tube assembly at a high speed while maintaining the tube assembly in a horizontal position to form a uniform powder layer on the inner surface of the support tube, supplying gas under high pressure into the hollow interior of the flexible rubber tube which rotates at the same speed as the support tube during the rotation of the tube assembly to expand the flexible rubber tube radially and outwardly so as to compress the powder against the inner surface of the support tube in a uniform layer.

When a tubular multi-layered porous barrier is to be mounted on a diffusion cell, in order to air-tightly connect the opposite ends of the tubular multi-layered porous barrier to the diffusion cell it is necessary to connect end members to the opposite ends of the multi-layered porous tube.

When the porous barrier layer forming powder is compressed against the support tube and the end members after the end members have been connected to the opposite ends of the barrier tube, and since the porous support tube has pores and a deformation property different from that of the end members, the porous barrier layer will easily develop a crack or cracks therein in the interface between the support tube and the end members. When a crack or cracks develop in the porous barrier layer, separation gas passes through the cracks instead of the barrier layer and then passes transversely through the support tube resulting in the lowering of the separation efficiency of the gas.

When the end members and the porous support tube on which the porous barrier layer is formed are nested within each other, and the members and tube are compressed together with the barrier layer interposed therebetween, the barrier will become very thin and have a low strength, and thus, the barrier will easily crack or separate itself from the support tube in the interface between the support tube and the end members. Similarly, when the porous support tube and the end members are compressed together to compress the powder against the porous support tube so as to form a porous barrier layer on the support tube fixed thereto, the powder present between the support tube and the end members is subjected to a compression force less than that to which the powder is subjected when the powder is compressed against only the porous support tube, because the end members absorb a portion of the compression force by its elasticity, and the thus formed porous barrier layer will have a larger pore diameter than the portion of the porous barrier layer formed on only the porous support tube and will have a lower gas separation efficiency.

Therefore, one principal object of the present invention is to provide a method for producing a novel multi-layered tubular porous barrier which can effectively eliminate the disadvantages inherent in the prior art methods.

Another object of the present invention is to provide a method for producing a tubular multi-layered porous barrier which comprises the steps of depositing fine powder having the average particle size of several 10 – several hundred A onto at least one of the inner and outer surfaces of a sintered tubular porous support member in a layer of uniform thickness to form a fine powder layer, pressuring the powder layer to form a barrier layer, and at the same time, compressing the thus formed barrier layer against the tube.

A further object of the present invention is to provide a method for producing a tubular multi-layered porous barrier in which the formation of said powder layer is carried out by the so-called dry method.

A further object of the present invention is to provide a method for producing a tubualr multi-layered porous barrier in which the formation of said powder layer and the compression of said powder layer against said tubular porous support member are carried out by a static pressure application.

A further object of the present inventin is to provide a method for producing a tubular multi-layered porous barrier in which the formation of said powder layer is carried out by the so-called wet method.

A further object of the present invention is to provide a method for producing a tubular multi-layered porous barrier in which the end members are compressed against a porous support tube simultaneously with said barrier layer being compressed against the porous support tube.

According to one aspect of the present invention, there has been provided a method for producing a tubular multi-layered barrier which comprises the steps of depositing a fine powder layer onto at least one of the inner and outer surfaces of a sintered tubular porous support member in a layer of uniform thickness, forming a porous barrier layer by compressing the deposited fine powder layer, and at the same time, compressing the barrier layer against said support tube by the application of pressure to the layer.

According to another aspect of the present invention, there has been provided a method for producing a tubular multi-layered porous barrier which comprises the steps of depositing fine powder onto at least one of the inner and outer surfaces of a sintered tubular porous support member in a layer of uniform thickness, forming a porous barrier layer by compressing deposited fine powder layer, and at the same time, compressing said barrier layer against the support tube by the application of pressure to the layer. The application of pressure to the barrier layer also secures the end members fitted in or on the porous support tube to the tube.

The above and other objects and attendant advantages of the present invention will be more apparent to those skilled in the art from a reading of the following detailed description in conjunction with the accompanying drawings which show preferred embodiments of the invention for illustration purpose only, but not for limiting the scope of the same in any way.

BRIEF DESCRIPTION OF THE DRAWINGS

FIG. 2A is a side elevational view in partial section showing a second embodiment of method for producing a tubular multi-layered porous barrier according to the present invention;

FIG. 2B is a cross-sectional view taken along substantially the line 2B — 2B of FIG. 2A;

FIG. 2C is a schematic view of an apparatus for carrying out the method as shown in FIG. 2A;

PREFERRED EMBODIMENTS OF THE INVENTION

Figure 1:
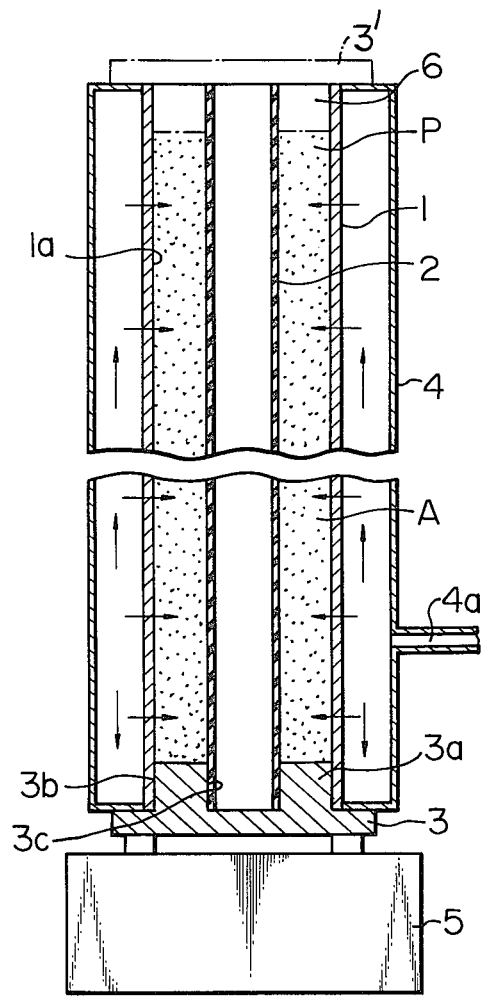
FIG. 1 is a sectional view showing a first embodiment of method for producing a tubular multi-layered porous barrier according to the present invention.

The present invention will be now described referring to the accompanying drawings and more particularly, to FIG. 1 thereof in which a first embodiment of the method for producing a tubular multi-layered porous barrier according to the present invention is shown. As shown in this Figure, a porous support tube 1 conventionally formed by the powder metallurgy method and having an average pore diameter of several μ, a wall thickness of 1 mm, a porosity of 30 - 40%, an outer diameter of 15 mm and a length of 1,000 mm is fitted at the lower end onto the outer periphery 3b of a center annular projection 3a on the top surface of a porous support plate 3 having pores in communication with each other. Similarly, a rigid-rubber, gas-impervious, flexible pipe 2 having the same length as the support tube 1 and an outer diameter smaller than the inner diameter of the support tube 1 by 2 mm is concentrically disposed within the support tube 1 and is fitted at the lower end in the inner periphery 3c of the annular projection 3a. The entire outer periphery of the porous support tube 1 is surrounded in a peripherally spaced relationship by a sleeve 4 having a gas inlet 4a extending laterally and outwardly from the wall of the sleeve. The support plate 3 is in turn supported on a vibrator 5 to be vibrated thereby. Micro-fine, barrier layer-forming material such as powder of metal, ceramic, organic synthetic resin or the like is charged into the annular space A defined between the support tube 1 and the flexible rubber pipe or tube 2 while the support plate 3 is being vibrated by the vibrator 5. Even if the barrier forming material is charged into the annular space A while the suport plate 1 is being vibrated, since the space is narrow, on the order of 1 mm, and, as long as 1,000 mm, it is impossible to uniformly fill the space with the barrier layer forming material. Therefore, as soon as the charging of the barrier layer forming material into the space A is initiated, gas such as nitrogen gas is intermittently supplied into the gas inlet 4a of the sleeve 4 to flow through the porous wall of the support tube 1 into the space A thereby fluidizing the material. In such a case, the charging of the material and the supply of the gas are effected alternately. The pressure of the gas at the time when the gas is introduced at the inlet 4 is initially set on the order of 5 kg/cm$^2$ and the gas pressure is accordingly decreased as the amount of the material within the space A increases gradually. The gas supplied into the space A is then allowed to discharge through the open top 6 of the annular space A and the porous support plate 3, respectively. In order to prevent the barrier layer forming material from overflowing through the open top 6 of the space as the gas is being supplied into the space A, a porous top plate 3' formed of the same material as the support plate 3 is fitted on and in the tops of the support tube 1, the flexible rubber pipe 2 and the space A. Even after a predetermined amount of the barrier layer forming material has been filled into the space A, the gas continues to be intermittently supplied into the space, whereby the material is uniformly distributed in the space A.

After the barrier layer forming material has been filled into the space to a predetermined amount, the sleeve 4 and the porous plates, 3, 3' are removed from the support tube 1 and the flexible rubber pipe 2. Thereafter, a flexible pipe formed of rubber or the like (not shown) is applied about the now exposed outer periphery of the support tube 1, and the opposite ends of the flexible pipe (not shown) are connected to the corresponding ends of the inner flexible pipe 2 by suitable means (not shown). Gas is discharged through the junctures between the two flexible pipes, and the junctures are then sealed to maintain the interior of the pipes and, accordingly, the support tube 1 and barrier layer forming material in a vacuum condition.

After having been sealed by the flexible pipes, the support tube 1 and the barrier layer forming material or powder P are placed into a suitable conventional hydrostatic pressure forming device (not shown) while being held between the flexible pipes. A static pressure on the order of 500 - 1500 kg/cm$^2$ is applied against the outer flexible pipe and the inner flexible pipe 2, respectively. In this way, the powdery material P is compressed against the inner surface 1a of the support tube 1 in a layer to form a porous barrier layer. The thus formed porous barrier layer has a substantially uniform thickness within the range of several 10 - several hundred μ. When the barrier layer is required to be sintered, the barrier layer is sintered in a suitable sintering furnace to produce a sintered, tubular, multi-layered, porous barrier.

During the static pressure molding operation, if any excessively high pressure is applied against the outer flexible pipe, the porosity of the obtained porous barrier will become insufficiently low and in consequence, the coefficient of gas permeability of the barrier will be low. Thus, a static pressure within the range of 500 - 1500 kg/cm$^2$ is suitable. The initial pressure of the gas supplied into the pores in the support tube 1 may be optionally selected depending upon the diameter and wall thickness of the tube and the specific gravity of the powderly material of which the annular multi-layered barrier is formed, but any initial pressure below 5 kg/cm$^2$ is generally sufficient.

In the foregoing, although description has been made of the embodiment in which the flexible rubber pipe 2 is concentrically disposed within the porous support tube 1 and then, powder P is charged into the annular space between the support tube and flexible pipe or tube to form a porous barrier layer on the inner surface of the support tube, it is also within the scope of the invention that a flexible pipe be concentrically disposed on the outer surface of the porous support tube so as to form a porous barrier layer on the outer surface of the support tube, or alternatively, flexible pipes could be concentrically disposed within and without the support tube, respectively, so as to form porous barrier gm layers on the inner and outer surfaces of the support tube.

Furthermore, when a porous barrier layer is formed on only one surface of the support tube, that is, either the inner or outer surface of the tube, a rigid steel pipe may be employed in place of the above-mentioned rubber pipe or tube. When it is desired to form a porous barrier layer on the inner surface of the porous support tube 1, a solid or hollow core member may be employed within the support tube. When materials having a low coefficient of friction such as tetrafluoroethylene and the like are employed as the porous barrier layer forming material after the static pressure forming operation of the barrier layer, the flexible or rigid pipe or core member can be easily pulled out of the thus formed porous multi-layered barrier.

According to the embodiment of the invention described hereinabove, a uniform thickness powdery layer can be more easily formed by the so-called dry-method rather than by the so-called wet-method which is rather complicated and presents many difficulties with respect to treatment and operation and the thus formed layer can be deposited on the support tube as the fine porous barrier layer when subjected to the above-mentioned static pressure molding step. Thus, by carrying out the method of the invention utilizing the dry-method, a small diameter porous multi-layered barrier can be easily obtained.

Referring now to FIGS. 2A through 2C, a modified embodiment of the method for producing a tubular multi-layered barrier is shown. In the embodiment of FIGS. 2A and 2B, a porous support tube 11 is concentrically surrounded by a flexible tube 12, and a holed tube 13 having a plurality of equally spaced small holes 13a in its peripheral wall and surrounded by a flexible tube 14 is concentrically disposed within the porous support tube 11. One end 13b of the holed tube 13 is closed. The annular space B between the porous support tube 11 and the flexible tube 14 is charged with micro-fine barrier layer forming powder, and after the powder has been filled into the space B, a rigid, split, supporting structure 15 is placed about the flexible tube 12 as shown in FIGS. 2A and 2B. A hard plug 16 is provided at the end of the annular space B defined by the other or open end of the support tube 11 and the adjacent end of the flexible tube 14, and a cup-shaped support member 17 is mounted adjacent to the pluged end of the space partially covering the split supporting structure 15. As more clearly shown in FIG. 2B, the split supporting structure 15 is divided into three sectors and one end 15a of the structure 15 is fitted in a circular recess 17a in the support member 17 to be integrally held by the support member together with the other parts. A hole 17b is provided in the center of the cup-shaped support member 17 extending therethrough and the end of the flexible tube 14 is passed through the hole 17b whereby the porous support tube 11, holed tube 13 and flexible tube 14 are concentrically held. The opposite ends of the holed tube 13 are provided with threads 13c for receiving nuts 13d thereon. When the nuts 13d are tightened, the holed tube 13 is maintained in its straight condition under tension against warping during the rotation of the tube 13. The thus formed assembly 10 is rotatably supported in the support structure 18a of a rotary device 18 as shown in FIG. 2C and rotated by a motor 18d through a speed change gear 18c and an endless belt 18b. The assembly 10 is preferably initially rotated at the speed of 50 – 200 r.p.m. to distribute the filled powdery material P in the longitudinal direction of the assembly and then at the speed of 1000 – 3000 r.p.m. to distribute the powder uniformly in the circumferential direction of the assembly. Gas is injected into the interior of the flexible tube 14 at the rate of 10 kg/cm² through the holes 13c in the holed tube 13 which is rotating at the same speed as the porous support tube 11 via a mechanical seal 19, for example to thereby cause the flexible rubber tube to expand radially and outwardly so as to deposit the powder on the porous support tube with a light pressure for forming a fine powder layer. The plug 16 holds the end of the flexible rubber tube 14 against its potential rupture as the flexible tube expands radially and outwardly. In order to increase the density of the micro-fine powder layer and further compress the layer against the porous support tube 11, the assembly 10 in which the powder layer has now been lightly deposited on the support tube 11 is removed from the rotary device of FIG. 2C and then formed under static pressure in the static pressure forming device. By the static pressure forming, the powder layer is subjected to pressure through the flexible tubes 12 and 14 into be formed to a porous barrier layer. The split supporting structure 15 serves to prevent the holed tube 13 from bending during the static pressure forming operation. If the static pressure is excessively high, the porosity of the porous barrier layer will be reduced and the coefficient of gas permeability will also be reduced. Thus, the static pressure is preferably within the range of 500 – 1500 kg/cm² depending upon the type of micro-fine powder employed.

When the micro-fine powder is a type that requires sintering, after the static pressure forming operation, the assembly 10 is heated in a furnace to sinter the powder layer, whereby a porous multi-layered barrier is provided.

As the porous support tube 11, a porous Ni tube having an average pore diameter of $2\mu$, porosity of 35%, inner diameter of 17 mm, outer diameter of 19 mm and length of 1200 mm is employed and as the flexible rubber tube 14, a raw rubber tube having the outer diameter of 8 mm extruded in an organic solvent is employed. Micro-fine powder of Ni or $Al_2O_3$ having the average particle diameter of 200 A is filled into the annular space between the porous support tube and raw rubber flexible tube, and the support tube and flexible tube are assembled together as shown in FIG. 2A. As to the amount of micro-fine powder to be filled into the space, when Ni is employed, the amount is 15.2 gr; and when $Al_2O_3$ is employed, the amount is 4.5 gr. The assembly 10 supported in the rotary device as shown in FIG. 2C is initially rotated at 150 r.p.m. for 3 minutes and then at 2000 r.p.m. for five minutes. Thereafter, compressed air is introduced at the rate of 10 kg/cm² into the holed tube 13 via the mechanical seal 19 to thereby expand the raw rubber flexible tube 14 radially outwardly while the assembly is rotating at the speed of 2000 r.p.m. This causes the powder layer to be deposited on the support tube with a light pressure. Thereafter, the air pressure is gradually reduced and the rotating assembly is stopped and removed from the rotary device. The removed assembly 10 is pressurized at the static pressure of 1000 kg/cm² in a static pressure forming device. When the powder is Ni, the powder is further subjected to sintering treatment at 200° C for thirty minutes. As to the thickness of the tubular multi-layered barrier, the thickness of the Ni barrier layer is about $70\mu$ and that of the $Al_2O_3$ barrier layer is about $50\mu$. As to the coefficient of Ar-gas permeability, that of the Ni barrier layer is $2.1 \times 10^{-5}$ mole/cm². cmHg.min and that of the $Al_2O_3$ barrier layer is $2.5 \times 10^{-5}$ mole/cm².cmHg.min. Both the Ni and the $Al_2O_3$ barrier have the same average pore diameter of 80 A.

As is clear from the foregoing description of the embodiment of FIGS. 2A and 2B, when the method is carried out utilizing the dry-method, a micro-fine barrier layer having a uniform thickness can be easily formed on the inner surface of a long porous support tube without the development of mud cracks which would be inevitable when slurry is employed and a tubular porous barrier of small diameter and high efficiency can be easily obtained. It is also possible to employ the apparatus of FIG. 2C for applying powder in a slurry form onto the inner surface of a porous support tube in a layer utilizing the wet method. In such a case, the powder applied as a slurry is dried while the outer surface of the porous support tube is maintained at a pressure lower than that at the inner surface thereof and then is pressurized in a static forming device to be formed into a porous barrier layer.

Figure 3A:
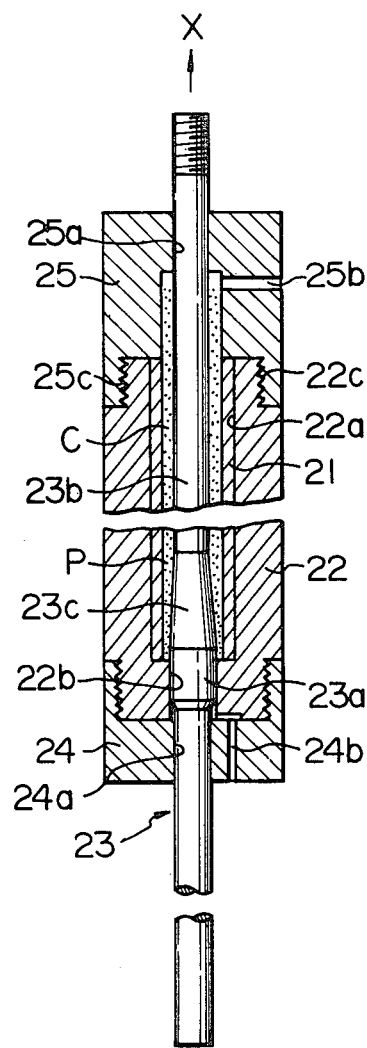
FIG. 3A is a sectional view showing a third embodiment of a method for producing a tubular multi-layered porous barrier according to the present invention.
Figure 3B:
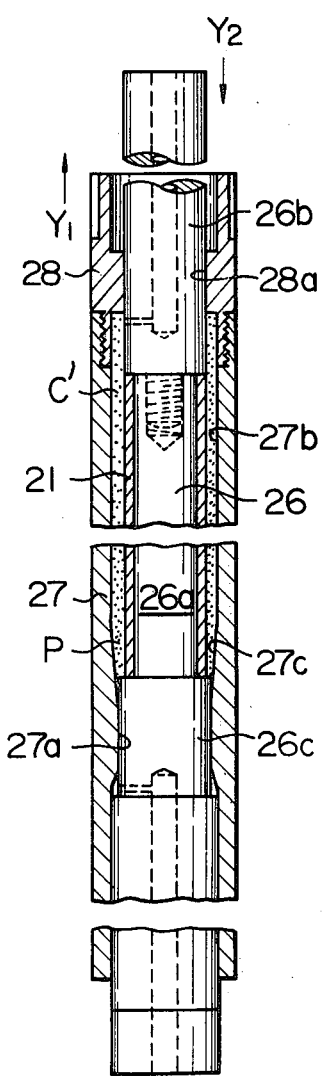
FIG. 3B is a sectional view showing a method similar to FIG. 3A, but explaining how to compress a porous barrier layer against the outer periphery of a sintered tubular porous support member.

FIGS. 3A and 3B show a further modified embodiment of the method for producing a tubular multi-layered porous barrier according to the present invention.

In this embodiment, a porous support tube 21 is concentrically received in the opening 22a of a support sleeve 22 which also has a second opening 22b the diameter of which is smaller than that of the first-mentioned opening 22a for receiving an enlarged diameter portion 23a of a die 23 which also has a reduced diameter portion 23b connected to the enlarged diameter portion 23a by means of a tapered intermediate portion 23c. The die 23 extends through the through holes 24a and 25a formed in guides 24 and 25, respectively, which are threaded on the threaded upper and lower ends of the support sleeve 22, respectively and is guided by the guides for slidable movement in the axial direction. The guide 24 is further formed with a port 24b in parallel to the hole 24a and similarly, the guide 25 is also formed with a transverse port 25b extending at right angles to the hole 25a in communication with the annular space C defined between the porous support tube and the die. The diameter of the enlarged portion 23a of the die 23 is selected so that powder P charged into the space C between the die 23 and porous support tube 21 is compressed against the inner surface of the porous support tube 21.

The above-mentioned device is vibrated with the upper guide 25 removed therefrom and powder P is charged into the space C between the porous support tube 11 and die 23. After the powder P has been filled into the space to a predetermined level, the upper guide 25 is replaced onto the upper portion of the die 23 and threaded onto the support sleeve 22 by means of the threads 25c and 22c on the upper guide and support sleeve, respectively, to hold the support sleeve 22 against movement and at the same time, to allow the die 23 to move axially in the arrow X direction relative to the support sleeve 22. Since the cross-section area of the space C is gradually reduced as the die 23 moves in the arrow X direction, the powder P is compressed against the inner surface of the porous support tube 11 in a tubular layer form with the gradually increasing pressure to form a porous barrier layer on the inner surface of the support tube 11. The port 24b in the lower guide 24 serves as an air vent to prevent development of any negative pressure on the lower portion of the die 23 and the port 25b in the upper guide 25 serves as an air vent to prevent the air which will be compressed by the tapered portion 23c of the moving die 23 from resisting the movement of the die 23 in the arrow X direction.

When a porous barrier layer is formed by the method of this embodiment, if the method is repeatedly carried out, the powder can be compressed with an increment of pressure. In such a case, it is preferably to in succession employ a plurality of die having tapered portions 23c of different or increasing diameters. Instead of pouring the powder P into the space between the die 23 and porous support tube 11, the powder may be deposited in a layer on the inner surface of the support tube by centrifugal force, application, electrophoresis or dipping procedure. It is, of course, possible to select powder having a different particle size each time when a series of porous barrier layer forming operation so as to mold a plurality of porous barrier layers having different pore diameters in the transverse direction or thickness of the layers.

FIGS. 3B shows a modification of the method of FIG. 3A and in the embodiment of FIG. 3B, the porous support tube 21 receives therein an intermediate reduced diameter portion 26a of a core member 26 to be supported by the core member internally. The upper and lower enlarged diameter portions 26b and 26c of the core member 26 which do not support the porous tube 21 have a length greater than that of the porous support tube 21 and extend out the upper and lower ends of the tube, respectively. The full length of the core member 26 is greater than three times as longs as the length of porous support tube. A cylindrical die 27 is fitted in the lower portion on the outer periphery of the lower enlarged diameter portion 26c of the core member 26. The inner periphery of the cylindrical die 27 has a lower reduced diameter portion 27a slidably received in the enlarged diameter portion 26c of the core member 26, an enlarged diameter portion 27b and an intermediate tapered portion 27c connecting between the portions 27a and 27b. The upper end of the die 27 is adapted to snugly receive the reduced diameter lower end of a guide 28 which has an opening 28a in which the enlarged diameter portion 26a of the core member 26 is slidably received. The length of the cylindrical die 27 is so selected that the reduced diameter portion 27a receives lower enlarged diameter portion 26a of the core member 26 and the opening 28a in the guide 28 receives the upper enlarged diameter portion 26b. The inner diameter of the reduced diameter portion 27b of the die 27 is greater than the outer diameter of the porous support tube 21 by a degree corresponding to the thickness of a porous coating or barrier layer to be formed on the porous support tube.

An annular space C' is defined between the porous support tube 21 and the cylindrical die 27 for receiving fine powder P and the tapered porton 27c of the die 27 serves to compress the powder P against the outer surface of the porous support tube 21. After the assembly has been formed in the manner described herein above, the powder P is charged into the space C' defined between the porous support tube 21 and the cylindrical die 27 with the assembly disposed uprightly as shown in FIG. 3B. After the space has been filled with the powder P to a predetermined level, the guide 28 is disposed on the upper portion of the core member 26 at the upper end of the cylindrical die 27 and held in position by means of the threads.

Thereafter, the cylindrical die 27 is moved axially in the arrow $Y_1$ direction and the core member 26 is moved axially in the opposite or arrow $Y_2$ direction while the porous support tube 21 and cylindrical die 27 are maintained in the concentrical relationship, whereby the powder P filled in the space C' between the porous support tube 21 and cylindrical die 27 is compressed against the outer surface of the porous support tube 21 to form a porous barrier layer on the outer surface of the support tube. In the embodiment of FIG. 3A, as the porous support tube 21, a Ni porous tube having the outer diameter of 18.0 mm wall thickness of 1.0 mm and length of 1 mm is employed; as the support sleeve 22, a steel sleeve having the inner diameter of 18.0 mm and wall thickness of 4 mm is employed; and as the die, a die having the enlarged portion of 15.8 mm in diameter and the reduced portion of 15.0 mm in diameter is employed. The space C' between the Ni porous support tube 21 and die 28 is charged with $Al_2O_3$ O powder having an average particle size of $0.02\mu$. After the powder P has been filled to a predetermined level in the space C', the die 23 is moved axially relative to the porous support tube. As the die 23 is moved in the axial direction relative to the porous support tube 21, the tapered portion 23c of the die 23 moves from one end to the other end of the porous support tube 21 (from the lower end to the upper end of the support tube as seen in FIG. 3A) to compress the filled powder against the inner surface of the porous support tube so as to form a porous barrier layer on the support tube surface.

Thereafter, a second die of the same type as the previously employed die 23 is inserted within the porous support tube 21, and powder is charged between the second die and the previously formed porous barrier layer. The die is then moved in the axial direction shown by the arrow X to compress the newly charged powder against the previously formed porous barrier to provide a further compressed porous barrier layer.

The thus formed annular porous multi-layered barrier comprises the Ni porous support tube 21 having the outer diameter of 18.0 mm and wall thickness of 1.0 mm and the $Al_2O_3$ porous barrier layer having a thickness of 100$\mu$. The properties of the tubular multi-layered porous barrier were determined, and it was found that the permeability for Ar isotope was $1.15 \times 10^{-0}$ mole/cm$^3$, cmHg. min. and the separation efficiency was 88%.

In the embodiment of FIG. 3B, as the porous support tube, a Ni porous support tube having the same configuration and dimensions as the porous support tube employed in the embodiment of FIG. 3A is employed. In the embodiment, a slurry formed by dissolving phenoxyacetic acid in a mixture liquid of acetone and toluene, adding r-$Al_2O_3$ powder of the average particle size of 0.02$\mu$ to the solution is supplied into the porous support tube with the outer surface of the tube maintained at a reduced pressure while the tube is rotating a 1500 r.p.m. so as to form a slurry layer on the outer surface of the porous support tube. The slurry is then dried to cause the powder to adhere to the support tube surface to form a powdery adhering layer.

After the drying of the powdery adhering layer, a die 23 having an enlarged diameter portion of 15.8 mm, a reduced diameter portion of 14.6 mm and a tapered portion 23a is inserted into the tube and moved from one to the other end of the porous support tube 21 in sliding contact with the powdery layer to further compress the powdery layer against the outer surface of the tube, thereby forming a porous barrier layer.

The properties of the thus provided tubular multilayered porous barrier were determined and it was found that the coefficient of permeability for Ar isotope was $1.05 \times 10^{-5}$ mole/cm$^2$, cmHg. min. and the separation efficiency was 52.5% at the differential pressure of 500 mmHg.

In the foregoing embodiments, description has been made of the use of $Al_2O_3$ powder as the powder for forming the porous barrier gm layer, but powders of ceramic, metals and organic resins such as tetrafluoroethylene and the like can be also employed to provide a tubular multi-layered barrier in the same manner as mentioned hereinabove.

Referring now to FIGS. 4A through 4D in which further modified embodiments of the method according to the present invention are shown.

In FIGS. 4A through 4D, reference numerals 41, 41', 41'' and 41''' denote a Ni porous support tube formed by the conventional powder metallurgy method and having the average particle diameter of 10$\mu$, porosity of 30 – 40%, outer diameter of 15 mm, wall thickness of 1 mm and length of 1000 mm in each case and reference numerals 42, 42', 42'' and 42''' denote an end member to be fitted on or in end of the porous Ni support tube in each case.

Figure 4A:
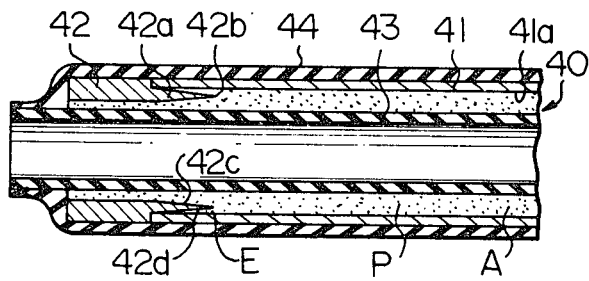
FIGS. 4A through 4D are sectional views showing other embodiments of methods for producing a tubular multi-layered barrier according to the present invention.

In the embodiment of FIG. 4A, the end member 42 is formed at the inner end with a reduced diameter portion 42a which has an acute angled tip end 42b defined by the inner and outer surfaces 42c and 42d converging toward the inner end of the end member. The end member 42 is connected to the porous support tube 41 with the reduced diameter portion 42a fitted in the adjacent end portion of the tube 41. A similar end member is also connected to the other end of the tube 41, but the description and showing of the other end member will be omitted herein for simplicity of explanation. With the end member 42 fitted in the porous support tube 41 as shown, there exists an annular clearance E between the inserted reduced diameter portion 42a and the inner surface 41a of the support tube 41 for the purpose to be described hereinafter. After the end members 42 have been fitted in the opposite end portions of the porous support tube 41, a flexible pipe 43 is passed through the hollow interior of the tube 41 and the pipe is formed of rigid rubber with the outer diameter smaller than the inner diameter of the support tube by about 2 mm so as to define an annular space D therebetween. When the thus formed assembly is disposed upright, the pipe 43 is held concentrically within the support tube 41. Thereafter, micro-fine powder P such as ceramic, metal or organic synthetic resin is charged into the space D defined between the flexible pipe 43 and the porous support tube 41, and it is noted that the powder P is also charged into the space E defined between the support tube and end members 42 when the space D is filled with the powder. Thereafter, the outer surfaces of the porous support tube 41 and end members 42 are covered by a flexible sleeve 44, and the opposite ends of the sleeve are then connected to the ends of the flexible pipe 43, but before the sleeve and flexible pipe are connected together, the air present between the sleeve and flexible pipe or tube is evacuated and the sleeve and pipe are then sealed. The thus formed sealed assembly is subjected to the static pressure of 500 – 1500 kg/cm$^2$ to compress to powder against the inner surfaces of the porous support tube 41 and end members 42 to form a finely porous barrier layer and at the same time, to connect the tube and end members together at their adjacent ends to provide a unitary structure.

Figure 4B:
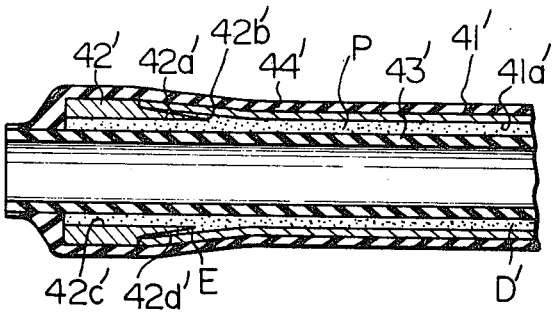

In the embodiment of FIG. 4A, the outer diameter of the porous support tube 41 is the same as that of the end members 42 to provide a right circular cylindrical configuration on the outer periphery. In the embodiment of FIG. 4B, the inner diameter of the porous support tube 41' is the same as that of the end members 42' to provide a right circular configuration in the inner periphery.

Thus, in the embodiment of FIG. 4B, the reduced diameter portion 42'a of each end member 42' is defined by the cylindrical inner surface 42'c and the conical outer surface 42'd.

Figure 4C:
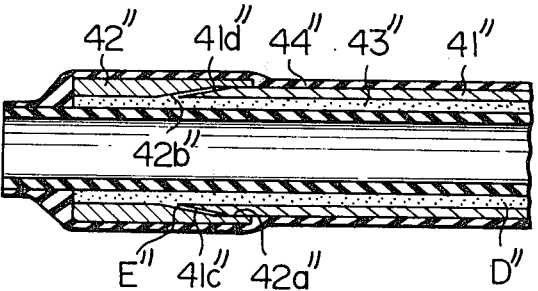

In the embodiment of FIG. 4C, each end portion 41''b of the porous support tube 41'' is formed with a concial projection 41''c which reduces its diameter toward the end member and is defined by a conical outer surface 41''d. In this embodiment, the conical projections 41''d are received in conical recesses 42''a in the end members 42'' and a clearance E'' is defined between the conical outer surface 41''d and the conical inner surface 42''b of the end member 42'' as in the case of the embodiments of FIGS. 4A and 4B. Compression of the powder P against the inner surfaces of the porous support tube 41" and end members 42" is effected in the same manner as mentioned in connection with the embodiments of FIGS. 4A and 4B, and a porous barrier layer is formed along the inner surfaces of the porous support tube 41" and end members 42". Simultaneously, the porous support tube 41" and end members 42" are pressed together to provide a unitary structure.

Figure 4D:
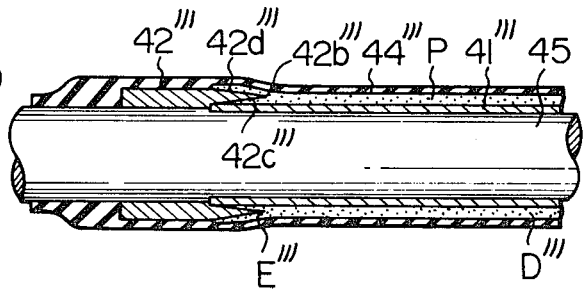

In the embodiment of FIG. 4D, the inner end of each end member 42''' has an acute triangular shape defined by conical inner and outer surfaces 42'''c and 42'''d. With the above configuration of the end member, the triangular inner end of the end member is fitted on the outer surface of the porous support tube 41'''. Powder P is caused to adhere to the outer surface 41''' of the support tube 41''' by electrophoresis or static pressure application. A core member 45 is passed through the hollow interior of the porous support tube 41''' and end members 42''' in close contact therewith. The outer surface of the fine powder P is covered by a flexible pipe 44''' formed of rubber, for example, and air present between the core member 45 and flexible pipe 44''' at their opposite ends is discharged. Thereafter, the opposite ends of the core member and flexible pipe are connected together. The thus formed assembly is subjected to static pressure to thereby connect the ends of the porous support tube 41''' to the corresponding ends of the end members 42''' and at the same time, to form a continuous porous barrier layer along the outer periphery of the support tube 41''' and end members 42'''.

In this case, when the flexible pipe 44''' is formed by a rigid rubber pipe, the powder P can be charged in the space between the porous support tube 41''' and flexible pipe 44'''.

Also in the embodiments as shown in FIGS. 4A to 4D, the powder P can be deposited on the inner or outer surface of the porous support tube by electrophoresis, electrostatic application or centrifugal forming or alternatively in slurry form.

In the embodiment of FIG. 4A ~ FIG. 4D, when a porous barrier layer is formed by compressing the powder against the porous support tube, the end members are also simultaneously pressed against the porous support tube. In such case, since the barrier layer forming powder is continuously present in the junctions between the porous support tube and end members and the mating end portions of the end members are formed in the form of a knife edge, the compression degree of the powder continuously varies from the center of the porous support tube to the ends of the tube and the gas permeability and pore diameter of the formed porous barrier at the inlets of the spaces between the porous support tube and end members is substantially the same as those in the center of the porous support tube. Therefore, there is no possibility that a crack or cracks develop in the porous barrier layer formed in the interface between the porous support tube and end members.

While several embodiments of the invention have been shown and described in detail, it will be understood that the same are for illustration purpose only and not to be taken as a definition of the invention, reference being had for the purpose to the appended claims.

What is claimed is:

1. A method for producing a tubular multi-layered porous barrier comprising the steps:
   depositing a fine powder selected from the group consisting of a metal, a ceramic or an organic synthetic resin onto the inner surface of a sintered tubular porous support member in a layer of uniform thickness, thereby forming a fine powdered layer, said fine powder deposition step including the steps of:
   supplying said fine powder into said porous support member,
   spreading said fine powder around the inner surface of said porous support member into a layer of uniform thickness, and
   compressing said fine powder layer against said inner surface of said porous support member by centrifugal force while rotating said porous support member, thereby adhering said layer to said support member; and
   static pressure compression-forming said powder layer against said support member by applying pressure against said fine powder layer radially and outwardly.

2. A method as claimed in claim 1, further comprising the steps of:
   fitting end members having an acute angled tip end to the opposite ends of said porous support member with said tip end spaced from the inner peripheral surface of said porous support member, said tip end being axially directed inward toward the interior of said porous support member and inserted into said powder layer;
   inserting a flexible tube inside said porous support member and said end members;
   covering the outer periphery of said porous support member and said end member with a flexible outer tube; and
   connecting said end members and said porous support members into a single unit by pressing said fine powder layer between said porous support member and said tip end by deformation of said tip end due to said compression forming of said powder layer while adhering said powder layer to said porous support member.

3. A method as claimed in claim 1, further comprising the steps of:
   forming acute angled tip ends on the opposite end portions of said porous support member;
   fitting end members on the opposite ends of said porous support member with said tip ends spaced from the inner peripheral surface of said porous support member, said fine powder layer also being deposited between said end members and said tip end;
   inserting a flexible inner tube within said porous support members and said end members;
   covering the outer periphery of said porous support member and said end member with a flexible outer tube; and
   connecting said end member to said porous support layer member to form a single unit by pressing said fine powder layer between said tip ends of said porous support member and said end members by deformation of said tip ends due to said compression-forming of said powder layer while adhering said powder layer to said porous support member.

4. A method as claimed in claim 1,
   wherein said fine powder deposition step further includes inserting a flexible tube into the hollow interior of said porous support member in a spaced relationship thereto before supplying said fine powder thereinto; and
   wherein supplying said fine powder into said porous support member comprises charging said fine powder between said porous support member and said flexible tube.

5. A method as claimed in claim 4, further comprising the steps of:
   fitting end members having an acute angled tip end to the opposite ends of said porous support member with said tip end spaced from the inner peripheral surface of said porous support member, said tip end being axially directed inward toward the interior of said porous support member and inserted into said powder layer;
   covering the outer periphery of said porous support member and said end member with a flexible outer tube; and
   connecting said end members and said porous support members into a single unit by pressing said fine powder layer between said porous support member and said tip end by deformation of said tip end due to said compression forming of said powder layer while adhering said powder layer to said porous support member.

6. A method as claimed in claim 4, further comprising the steps of:
   forming acute angled tip ends on the opposite end portions of said porous support member;
   fitting end members on opposite ends of said porous support member with said tip ends spaced from the inner peripheral surface of said porous support member, said fine powder layer also being deposited between said end members and said tip end;
   inserting a flexible tube within said porous support members and said end members;
   covering the outer periphery of said porous support member and said end member with a flexible outer tube; and
   connecting said end member to said porous support member to form a single unit by pressing said fine powder layer between said tip ends of said porous support member and said end members by deformation of said tip ends due to said compression forming of said powder layer while adhering said powder layer to said porous support member.

7. A method as claimed in claim 1, wherein supplying said fine powder into said porous support member comprises charging a slurry comprised of said fine powder and a liquid dispersion agent into the hollow interior of said porous support member and depositing said slurry onto the inner surface of said porous support member; and
   wherein said fine powder deposition step further includes a step drying said deposited slurry while maintaining the pressure within said porous support member higher than the pressure on the outer surface of said porous support member.

8. A method as claimed in claim 7, further comprising the steps of:
   fitting end members having an acute angled tip end to the opposite ends of said porous support member with said tip end spaced from the inner peripheral surface of said porous support member, said tip end being axially directed inward toward the interior of said porous support member and inserted into said powder layer;
   inserting a flexible tube inside said porous support member and said end members;
   covering the outer periphery of said porous support member and said end member with a flexible outer tube; and
   connecting said end members and said porous support members into a single unit by pressing said fine powder layer between said porous support member and said tip end by deformation of said tip end due to said compression forming of said powder layer while adhering said powder layer to said porous support member.

9. A method as claimed in claim 7, further comprising the steps of:
   forming acute angled tip ends on the opposite end portions of said porous support member;
   fitting end members on the opposite ends of said porous support member with said tip ends spaced from the inner peripheral surface of said porous support member, said fine powder layer also being deposited between said end members and said tip end:
   inserting a flexible inner tube within said porous support members and said end members;
   covering the outer periphery of said porous support member and said end member with a flexible outer tube; and
   connecting said end member to said porous support member to form a single unit by pressing said fine powder layer between said tip ends of said porous support member and said end members by deformation of said tip ends due to said compression-forming of said powder laying while adhering said powder layer to said porous support member.

10. A method for producing a tubular multi-layered porous barrier comprising the steps of:
    depositing a fine powder selected from the group consisting of a metal, a ceramic, or an organic synthetic resin onto the inner surface of a sintered tubular porous support member in a layer of uniform thickness, thereby forming a fine powder layer, said fine powder deposition step including the steps of:
       inserting a flexible tube into the hollow interior of said porous support member in a spaced relationship from the inner periphery of said porous support member,
       charging said fine powder between said porous support member and said flexible tube,
       spreading said fine powder onto the inner surface of said porous support member into a layer of uniform thickness, and
       compressing said fine powder layer against said inner surface of said porous support member by centrifugal force while rotating said porous support member and said flexible tube together and by a fluid pressure force acting on the inner surface of said flexible tube and expanding it radially outwardly, whereby the fine powder layer is adhered to said support member; and
    static pressure compression-forming said powder layer against said support member by applying pressure against said fine powder layer radially and outwardly.

11. A method as claimed in claim 10, further comprising the steps of:
    fitting end members having an acute angled tip end to the opposite ends of said porous support member with said tip end spaced from the inner peripheral surface of said porous support member, said tip end being axially directed inward toward the interior of said porous support member and inserted into said powder layer;

covering the outer periphery of said porous support member and said end member with a flexible outer tube; and connecting said end members and said porous support members into a single unit by pressing said fine powder layer between said porous support member and said tip end by deformation of said tip end due to said compression-forming of said powder layer while adhering said powder layer to said porous support member.

12. A method as claimed in claim 10, further comprising the steps of:

forming acute angled tip ends on the opposite end portions of said porous support member;

fitting end members on the opposite ends of said porous support member with said tip ends spaced from the inner peripheral surface of said porous support member, said fine powder layer also being deposited between said end members and said tip end;

covering the outer periphery of said porous support member and said end member with a flexible outer tube; and connecting said end member to said porous support member to form a single unit by pressing said fine powder layer between said tip ends of said porous support member and said end members by deformation of said tip ends due to said compression-forming of said powder layer while adhering said powder layer to said porous support member.

* * * * *